(12) United States Patent
Vora (10) Patent No.: US 11,320,979 B1
(45) Date of Patent: May 3, 2022

(54) ACCESS CONTROL FOR ONLINE PRESENTATIONS

(71) Applicant: salesforce.com, inc., San Francisco, CA (US)

(72) Inventor: Darshil Vipul Vora, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/071,208

(22) Filed: Oct. 15, 2020

(51) Int. Cl.
*G06F 3/0482* (2013.01)
*G06F 3/04847* (2022.01)
*H04L 12/18* (2006.01)

(52) U.S. Cl.
CPC ........ *G06F 3/04847* (2013.01); *G06F 3/0482* (2013.01); *H04L 12/1818* (2013.01)

(58) Field of Classification Search
CPC . G06F 3/04847; G06F 3/0482; H04L 12/1818
See application file for complete search history.

(56) References Cited

U.S. PATENT DOCUMENTS

| | | | | |
|---|---|---|---|---|
| 9,244,533 B2* | 1/2016 | Friend | ...................... | G06F 3/017 |
| 10,303,715 B2* | 5/2019 | Graham | .............. | G06F 16/3329 |
| 10,554,697 B1* | 2/2020 | Ledet | .................. | H04L 65/1069 |
| 2006/0041686 A1* | 2/2006 | Caspi | ...................... | G06Q 10/10 |
| | | | | 709/248 |
| 2006/0195520 A1* | 8/2006 | Stevens | ............... | H04L 12/1827 |
| | | | | 709/204 |
| 2007/0033528 A1* | 2/2007 | Merril | ..................... | G10L 15/26 |
| | | | | 715/732 |
| 2007/0222747 A1* | 9/2007 | Kritt | ................... | H04L 12/1827 |
| | | | | 345/156 |
| 2007/0266094 A1* | 11/2007 | Chang | .................... | G06Q 10/10 |
| | | | | 709/204 |
| 2008/0116255 A1* | 5/2008 | Hilbert | ................ | G06F 16/5846 |
| | | | | 235/375 |
| 2008/0306954 A1* | 12/2008 | Hornqvist | ........... | G06F 21/6218 |
| 2011/0066636 A1* | 3/2011 | Guido | ................... | G06F 40/103 |
| | | | | 707/769 |

(Continued)

OTHER PUBLICATIONS

Cisco Webex Help Center, "How Do I Pass the Presenter Role to an Attendee or Participant?", Aug. 24, 2020, pp. 1-3 "https://help.webex.com/en-us/WBX1800/How-Do-I-Pass-the-Presenter-Role-to-an-Attendee-or-Participant" (Year: 2020).*

(Continued)

*Primary Examiner* — Shen Shiau
(74) *Attorney, Agent, or Firm* — Sterne, Kessler, Goldstein & Fox P.L.L.C.

(57) ABSTRACT

A method, a system, and a non-transitory computer readable medium (CRM) for controlling access to an online presentation are disclosed. At least one embodiment includes granting a controller status to a first user for a first slide during the online presentation. Then operating the online presentation based on a set of slide commands from the first user having the controller status. The at least one embodiment also includes determining a second user is to have the controller status for a second slide during the online presentation, and transferring the controller status from the first user to the second user for the second slide during the online presentation.

15 Claims, 7 Drawing Sheets

(56) References Cited

U.S. PATENT DOCUMENTS

| | | | |
|---|---|---|---|
| 2012/0317487 A1* | 12/2012 | Lieb | G06F 3/04886 715/730 |
| 2013/0006695 A1* | 1/2013 | Haustein | G06Q 10/02 705/7.26 |
| 2013/0073965 A1* | 3/2013 | Sik | G09G 5/12 715/730 |
| 2013/0212250 A1* | 8/2013 | Kleppner | H04L 67/06 709/224 |
| 2014/0010520 A1* | 1/2014 | Bhatia | H04N 1/00198 386/278 |
| 2014/0033058 A1* | 1/2014 | Perotti | G08C 17/00 715/740 |
| 2014/0282013 A1* | 9/2014 | Amijee | G06F 3/0482 715/732 |
| 2014/0289530 A1* | 9/2014 | De Waal | H04N 21/4788 713/171 |
| 2014/0340468 A1* | 11/2014 | Winterstein | H04N 7/15 348/14.08 |
| 2014/0344360 A1* | 11/2014 | Bank | G06Q 50/01 709/204 |
| 2015/0099505 A1* | 4/2015 | Kiukkonen | H04M 1/72412 455/419 |
| 2015/0180919 A1* | 6/2015 | Brunson | H04L 12/1822 709/204 |
| 2015/0222577 A1* | 8/2015 | Weir | G06F 3/0482 715/730 |
| 2016/0094355 A1* | 3/2016 | Waltermann | H04L 12/1822 715/755 |
| 2018/0013815 A1* | 1/2018 | Gold | H04M 1/72412 |
| 2018/0145840 A1* | 5/2018 | Advani | H04L 51/32 |
| 2019/0129968 A1* | 5/2019 | Neylan | G06Q 3/0643 |
| 2019/0158492 A1* | 5/2019 | Zavesky | G06F 16/951 |
| 2019/0297134 A1* | 9/2019 | Gold | H04M 1/72415 |

OTHER PUBLICATIONS

International Search Report and Written Opinion in PCT/US2021/054941, dated Nov. 19, 2021, 10 pages.

* cited by examiner

ACCESS CONTROL FOR ONLINE PRESENTATIONS

BACKGROUND

Online presentations with slides are becoming increasingly popular. In many cases, a single online presentation may have multiple presenters. For example, different presenters may be responsible for discussing the contents of different slides. Currently, despite the multiple presenters, a single presenter maintains control of the slides throughout the online presentation. Accordingly, it would be beneficial to transfer control of the different slides to different presenters during the online presentation.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method, and/or computer program product embodiments for controlling access to an online presentation. The online presentation has multiple slides, and for any given slide, one or more users are designated with controller status. Only slide commands received from users with controller status are executed against the slide. Controller status may be transferred to different users as different slides of the online presentation are displayed. Users may be designated with controller status when the slides are initially generated or edited (i.e., the designations are carried out before the online presentation begins). Additionally or alternatively, these designations may happen while the online presentation is running. Regardless of when designation of controller status occurs, no single user is responsible for issuing slide commands for the entire online presentation. Instead, control of the slides is transferred among the users depending on the slide that is being displayed.

Figure 1:
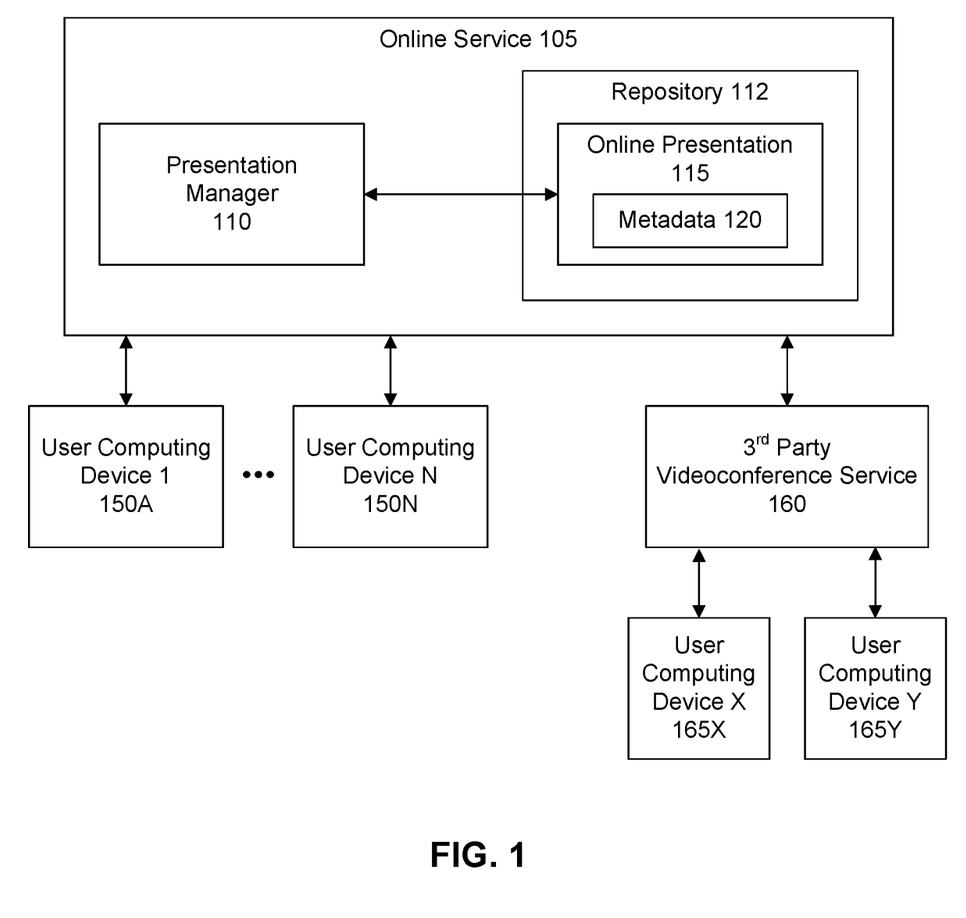
FIG. 1 shows a system for controlling access to an online presentation in accordance with one or more embodiments.

FIG. 1 shows a system for controlling access to an online presentation in accordance with one or more embodiments. As shown in FIG. 1, the system includes an online service 105 with a presentation manager 110 and a repository 112. The online service 105 may execute on one or more computing devices (e.g., servers, mainframes, desktop personal computers (PCs), tablet PCs, mobile devices, etc.) connected by a network with wired and/or wireless segments.

In one or more embodiments, online service 105 is a cloud computing service. Presentation manager 110 may be one of various applications (not shown) made available to users with accounts at online service 105. Users access these applications (e.g., presentation manager 110) by connecting to online service 105 with user computing devices (e.g., user computing device 1 150A, user computing device N 150N). Examples of user computing devices 150 include desktop PCs, tablet PCs, laptops, smart phones, etc.

In one or more embodiments, presentation manager 110 is utilized to generate and edit online presentations (e.g., online presentation 115). A single online presentation may be generated and/or edited by one or more users. A user who participants in the generating or editing of online presentation 115 may be referred to as an author. Online presentation 115 may include multiple slides and each slide may include text, graphics, multimedia elements (e.g., video clips, audio clips, animation sequences), etc.

In one or more embodiments, presentation manager 110 is also configured to run online presentation 115. In other words, online presentation 115 may be started from within presentation manager 110. Moreover, presentation manager 110 may enable the user that started online presentation 115 to invite other users to view online presentation 115.

In one or more embodiments, online service 105 interfaces with a $3^{rd}$ party videoconferencing service 160. This interface enables users who don't have accounts with online service 105 to also view online presentation 115. For example, the users with accounts at online service 105 may all be employees of a business entity. These users view online presentation 115 on their user devices 150 via their access to presentation manager 110. In contrast, the users viewing online presentation 115 through the videoconferencing service 160 may be customers of the business entity, vendors of the business entity, or even investors or potential investors in the business entity. These users view online presentation 115 on user devices 165 (e.g., user computing device X 165X, user computing device Y 165Y).

As another example, the users with accounts at online service 105 may all be panelists at a conference. In contrast, the users viewing online presentation 115 though videoconferencing service 160 may be the audience members at the conference.

In one or more embodiments, when online presentation 115 is running and a slide is displayed, presentation manager 110 may receive and execute slide commands against the slide. A request to activate (e.g., play, re-play, pause, fast-forward, rewind, etc.) a multimedia element on the slide is an example of a slide command. A request to highlight text or graphics on the slide with a pointer tool is an example of a slide command. A request to annotate the slide (e.g., add notes or comments to the slide) during the online presentation is an example of a slide comment. A request to advance to the next slide (i.e., next slide command) is an example of a slide command.

In one or more embodiments, when online presentation 115 is running and a slide is displayed, presentation manager 110 only executes slide commands received from the user or users with controller status. Slide commands received from other users (i.e., users that do not have controller status) are ignored and/or discarded. Presentation manager 110 may transfer the controller status to different users for different slides sets (i.e., one or more slides of online presentation 115). This is especially useful when different users are responsible for discussing/interacting with different slides while online presentation 115 is running.

In one or more embodiments, the users with controller status for each slide set are designated by the authors when the online presentation is generated or edited (i.e., before online presentation 115 starts). These designations regarding controller status may be stored in metadata 120. Additionally or alternatively, controller status designation may take place while online presentation 115 is running (discussed below).

In one or embodiments, presentation manager 110 may cause control grant messages to be displayed to users, control revocation messages to be displayed to users, control panels to be displayed to users, and control dashboards to be displayed to users (discussed below).

Figure 2A:
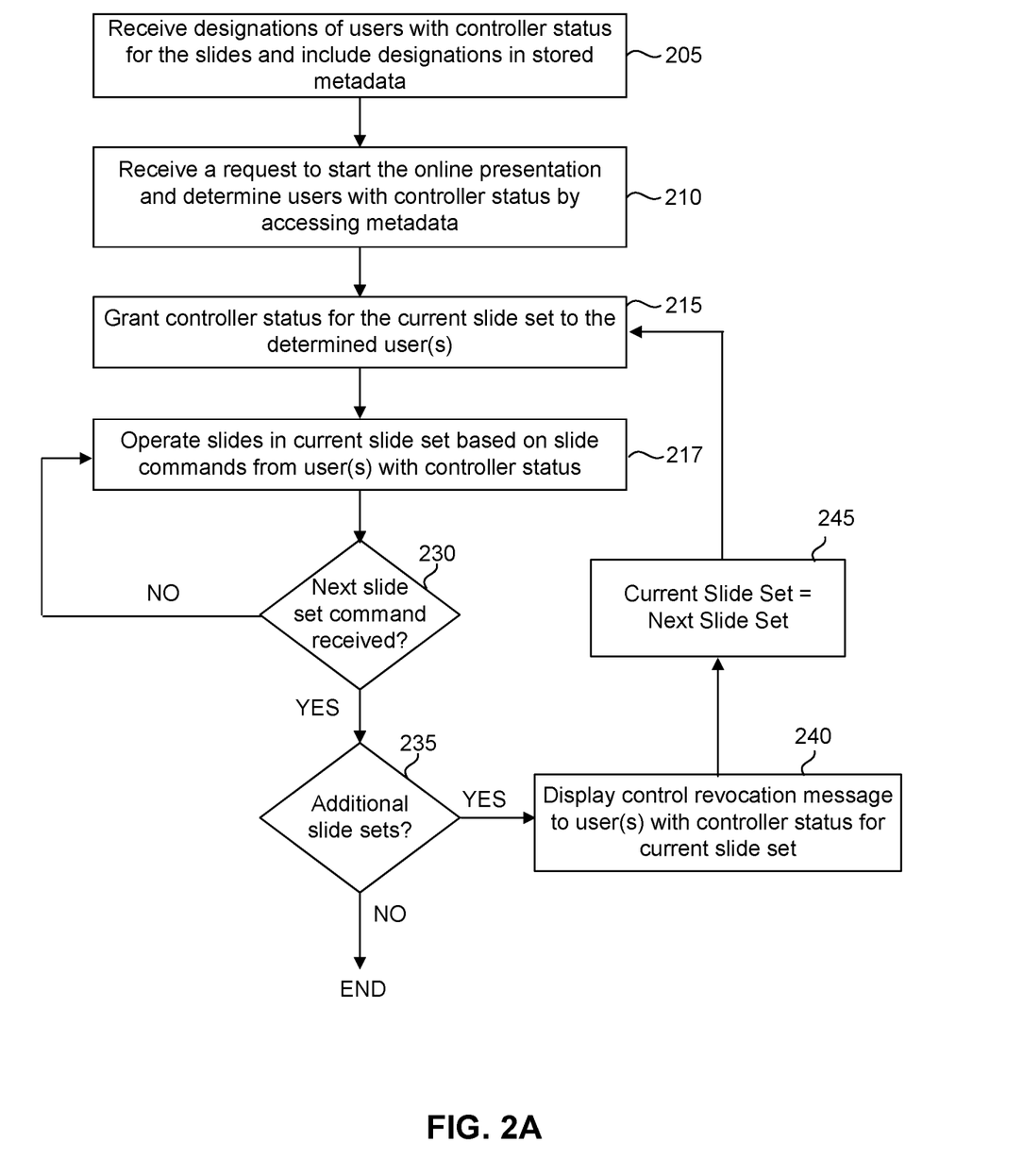
FIG. 2A and FIG. 2B show flowcharts for controlling access to an online presentation in accordance with one or more embodiments.

FIG. 2A shows a flowchart for controlling access to an online presentation in accordance with one or more embodiments. The steps in FIG. 2A may be executed by one or more of the components (e.g., online service 105, presentation manager 110) discussed above in reference to FIG. 1. In one or more embodiments, one or more of the steps shown in FIG. 2A may be omitted, repeated, and/or performed in a different order than the order shown in FIG. 2A. Accordingly, the scope of the invention should not be considered limited to the specific arrangement of steps shown in FIG. 2A. The steps shown in FIG. 2A may be implemented as computer-readable instructions stored on computer-readable media, where, when the instructions are executed, cause a processor to perform the process of FIG. 2A.

At step 205, when the slides of an online presentation are being generated or edited in presentation manager 110, an author of the online presentation may designate one or more users with controller status for each slide. These users might or might not be authors of the online presentation. Specifically, presentation manager 110 may display a controller status GUI with widgets (discussed below), and the author may manipulate these widgets to designate the user(s) with controller status for each slide. For example, the author may designate a first user with controller status for slides 1-7, a second user with controller status for slide 8, both a third user and a fourth user with controller status for slides 9-12, etc. These designations may be included in metadata stored within the online presentation or stored separately from the online presentation.

In one or more embodiments, consecutive slides having the same user(s) with controller status form a slide set. In the example above, slides 1-7 form a slide set (e.g., slide set A) and slides 9-12 form a slide set (e.g., slide set C). A single slide, by itself, may also form a slide set if the slide before and the slide after do not have the same user(s) with controller status as the single slide. Accordingly, in the example above, slide 8, by itself, also forms a slide set (e.g., slide set B). An online presentation may have any number of slide sets. Moreover, the same user(s) may designated with controller status for multiple slide sets.

In step 210, a request to start the online presentation is received. In one or more embodiments, the request to start the online presentation may be invoked from within presentation manager 110. The user that starts the online presentation may send invites to other users to view the online presentation via presentation manager 110. In response to this request to start, the stored metadata from step 205 is accessed and parsed to determine which users have controller status for which slide sets of the online presentation.

In step 215, controller status is granted to a user(s) for the current slide set, as determined from the metadata. If this is the first execution of step 215, the current slide set may be the first slide set in the online presentation. If this is the $N^{th}$ execution of step 215, the current slide set may be the $N^{th}$ slide set in the online presentation. Granting controller status to the user may include causing a control grant message (e.g., "User: You currently have controller status") to be displayed to the user on a computing device operated by the user. Granting controller status may also include monitoring only for slide commands from the user(s) with controller status. If slide commands are received from other users (i.e., users that do not have controller status for the current slide set), these slide commands may be ignored or discarded.

In one or more embodiments, granting controller status also includes causing a control panel (discussed below) to be displayed to the user with controller status. The control panel may display scaled down versions of the current slide, the previous slide, and the next slide during the online presentation. The control panel may also include a list of slides or slide sets and the user(s) with controller status for the slides. Alternatively, the control panel may only display the user(s) with controller status for the next slide set. In one or more embodiments, the control panel includes an override widget (e.g., button) (discussed below).

In step 217, each slide in the current slide set is displayed and operated during the online presentation based on slide commands from the user(s) with controller status. In one or more embodiments, each slide may be associated with a set of slides commands (i.e., one or more slide commands). For example, a slide may have a multimedia element (e.g., video clip, an audio clip, an animation sequence, etc.). A request to activate (e.g., play, re-play, pause, fast-forward, rewind, etc.) the multimedia element during the online presentation is an example of a slide command. A request to highlight text or graphics on the slide with a pointer tool during the online presentation is an example of a slide command. A request to annotate the slide during the online presentation is an example of a slide comment. A request to advance to the next slide (i.e., next slide command) is an example of a slide command.

In step 230, it is determined whether a next slide set command has been received from the user with the controller status. The next slide set command is effectively the next slide command while the last slide of the slide set is being displayed. For example, if slide set A includes slides 1-4, the next slide command while slide 4 is displayed (i.e., the last slide of the slide set) is a next slide set command. When it is determined that the next slide set command has been received from the user with controller status, the process proceeds to step 235. Otherwise, when it is determined that the next slide set command has not been received, the process returns to step 217.

In step 235, it is determined whether the online presentation has additional slide sets. When it is determined that the online presentation has one or more additional slide sets, the process proceeds to step 240. When it is determined that there are no additional slide sets (i.e., the current slide set is the last slide set in the online presentation), the process might end.

In step 240, a control revocation message is displayed to the user(s) with controller status for the current slide set. The control revocation message may read: "Controller status has been successfully transferred to another user." In step 245, the next slide set is deemed to be the current slide set. Then, the process returns to step 215. The combination of step 240 followed by step 215 may be considered transferring the controller status from one user to another user. Step 240 may be omitted if the user with controller status for the current slide set also has controller status for the next slide set, as determined from the metadata.

As discussed above, the control panel of step 215 may include an override widget (e.g., button) (discussed below). While the user has controller status, the user may issue an override command by manipulating the override widget. The override command is a request that the controller status for the next slide set remain with the user. In other words, the override command is a request to not transfer the controller status away from the user, even if this contradicts controller status designations specified in the metadata.

For example, assume the metadata specifies that user A has controller status for slide set A and user B has controller status for slide set B (which follows slide set A). User A may issue an override command. The override command is a request that user A maintain the controller status for slide set B, even though this contradicts the metadata. This feature may be useful when user B is unable to attend the online presentation due to illness, a double-booked schedule, a failed network connection with user B's computing device, etc. This feature enables user A to take over the online presentation on behalf of user B. During the next execution of step 215, controller status for slide set B will be granted to user A instead of user B.

Figure 2B:
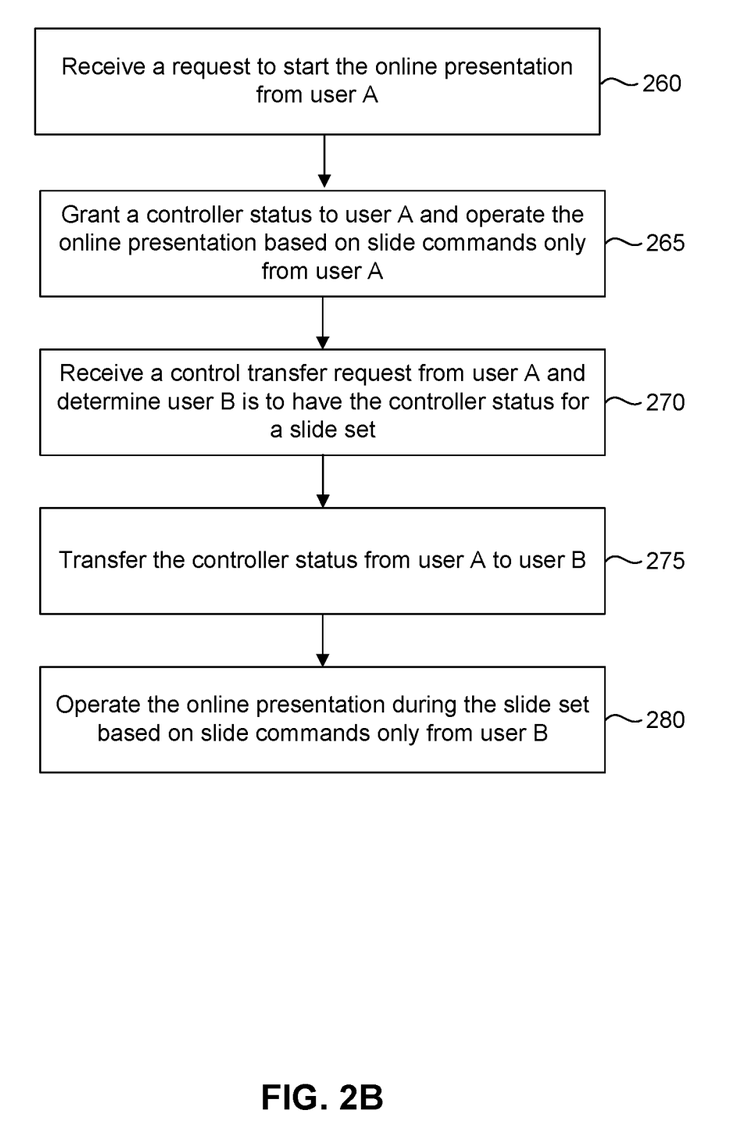

FIG. 2B shows a flowchart for controlling access to an online presentation in accordance with one or more embodiments. The steps in FIG. 2B may be executed by one or more of the components (e.g., online service 105, presentation manager 110) discussed above in reference to FIG. 1. In one or more embodiments, one or more of the steps shown in FIG. 2B may be omitted, repeated, and/or performed in a different order than the order shown in FIG. 2B. Accordingly, the scope of the invention should not be considered limited to the specific arrangement of steps shown in FIG. 2B. The steps shown in FIG. 2B may be implemented as computer-readable instructions stored on computer-readable media, where, when the instructions are executed, cause a processor to perform the process of FIG. 2B.

In one or more embodiments, in the process depicted in FIG. 2B, the users who will have controller status are not known before the online presentation starts. This is in contrast to FIG. 2A, in which the users with controller status are designated during generation or editing of the online presentation and stored in metadata.

In step 260, a request to start the online presentation is received from user A. The online presentation may have any number of slides and may have been generated by one or more authors. User A might or might not be one of the authors. In one or more embodiments, the request to start the online presentation may be invoked from within presentation manager 110. User A may send invites to other users to view the online presentation via presentation manager 110.

In step 265, user A is granted controller status in response to the request to start the online presentation. Granting controller status to user A may include causing a control grant message (e.g., "User A: You currently have controller status") to be displayed to user A on a computing device operated by user A. Granting controller status may also include monitoring only for a set of slide commands (i.e., one or more slide commands) from user A. If slide commands are received from other users, these slide commands may be ignored or discarded.

In one or more embodiments, granting controller status also includes causing a control dashboard (discussed below) to be displayed to user A. The control dashboard provides a mechanism for user A to transfer the controller status to other users. In one or more embodiments, the control dashboard may be populated with the authors of the online presentation. Additionally or alternatively, the control dashboard may be populated with all users who have an account with online service 105. Additionally or alternatively, the control dashboard may be populated only with users that are currently viewing the online presentation.

In step 270, a control transfer request is received. The control transfer request may be generated by user A manipulating the GUI widgets of the control dashboard. The control transfer request may specify a slide set (i.e., one or more slides) and the one or more users that should have controller status for the slide set. For example, the control transfer request may designate user B with controller status for the slide set including slides 2-5. As another example, the control request may designate user B with controller status for just the current slide. As yet another example, the control transfer request may designate user B with controller status for the slide set including slide 2 and all remaining slides until the end of the online presentation. The control transfer request may be parsed to determine the user(s) with controller status for various slides.

In step 275, the controller status is transferred from user A to user B. This step may be executed immediately if the control transfer request designates user B with controller status for the slide currently being displayed during the online presentation. Additionally or alternatively, this step is delayed until a next slide command is received and the next slide is one where user B has controller status. For example, the control transfer request may be received while slide 2 is displayed and may designate user B with controller status for the slide set including slides 10-15. In this example, step 275 is executed when both slide 9 is displayed and a next slide command is received (i.e., advancing the online presentation to slide 10).

Transferring the controller status may include displaying a control revocation message is displayed to user A. The control revocation message may read: "Controller status has been successfully transferred to user B." Transferring the controller status may also cause a control grant message (e.g., "User B: You currently have controller status") to be displayed to user B on a computing device operated by user B. Transferring controller status may also include monitoring only for slide commands from user B. If slide commands are received from other users, these slide commands may be ignored or discarded.

In one or more embodiments, transferring controller status also includes causing a control dashboard to be displayed to user B. As discussed above, the control dashboard provides a mechanism for user B to transfer the controller status to other users. In one or more embodiments, user B can only give controller status to other users for the slides which user B has been granted controller status. For example, if user A grants user B with controller status for slides 5-11, user B may give controller status to other users for any of slides 5-10, but not slides 1-4 and not slides 12 and above.

In step 280, the slide set referenced in the control transfer request of step 270 is operated based on slide commands from user B (or other users to whom user B had given controller status). In other words, only slide commands from user B are executed. As discussed above, slide commands may include a request to activate (e.g., play, re-play, pause, fast-forward, rewind, etc.) multimedia elements within the slide set, a request to highlight text or graphics on the slide with a pointer tool during the online presentation, a request to annotate the slide during the online presentation, a request to advance to the next slide (i.e., next slide command).

In one or more embodiments, if user B is not given controller status for all the remaining slides of the online presentation (e.g., the slide set from step 270 does not include all remaining slides of the online presentation), controller status may be transferred back to user A at the end of the slide set. For example, if user A grants user B controller status for slides 8-12 (and the online presentation has more than 12 slides), controller status may automatically be transferred back to user A for slide 13.

Those skilled in the art, having the benefit of this detailed description, will appreciate that in FIG. 2A, designating users with controller status takes place before running online presentation 115. In contrast, in FIG. 2B, designating users with controller status takes place while online presentation 115 is running. In one or more embodiments, both of these scenarios can be combined. Specifically, designating users with controller status can take place before running online presentation 115 (e.g., using the controller status GUI discussed in FIG. 2A), but then changed while online presentation 115 is running (e.g, using the control dashboard discussed in FIG. 2B).

Figure 3:
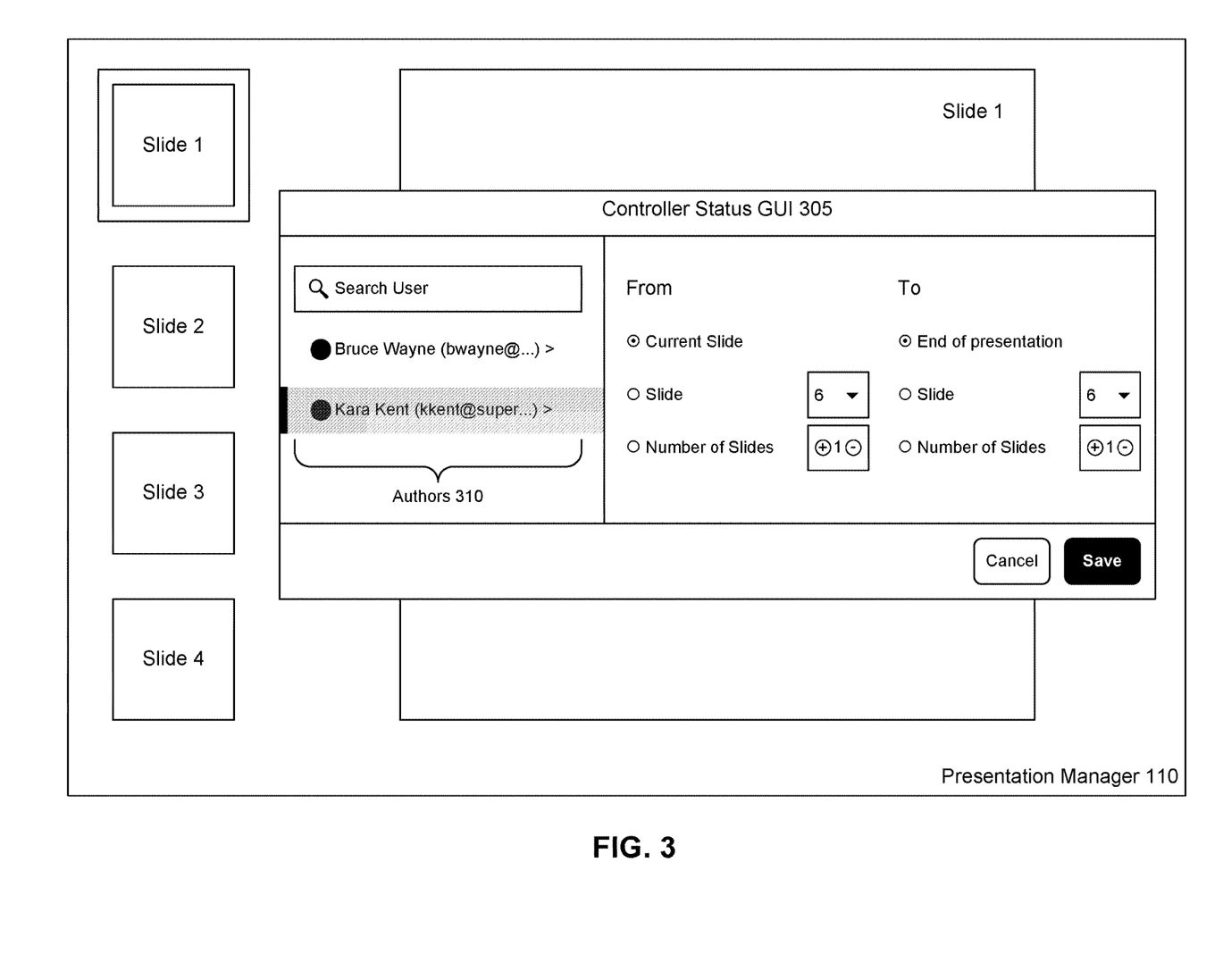
FIG. 3 shows an example of a controller status GUI in accordance with one or more embodiments.

FIG. 3 shows an example controller status GUI 305 in accordance with one or more embodiments. Controller status GUI 305 may be invoked from within presentation manager 110 while online presentation 115 is being generated or edited. As shown in FIG. 3, controller status GUI 305 has multiple GUI widgets including drop-down boxes, radio buttons, etc.

In one or more embodiments, a user manipulates the GUI widgets of controller status GUI 305 to designate authors with controller status for various slides. This is done any time before running online presentation 115. The left side of controller status GUI 305 may provide a list of authors 310 that can be selected. The right side of controller status GUI 305 is used to select the slides for which the selected authors will have controller status. These designations may be stored in metadata 120 and may be accessed when online presentation is started, as discussed above in reference to FIG. 2A.

Figure 4:
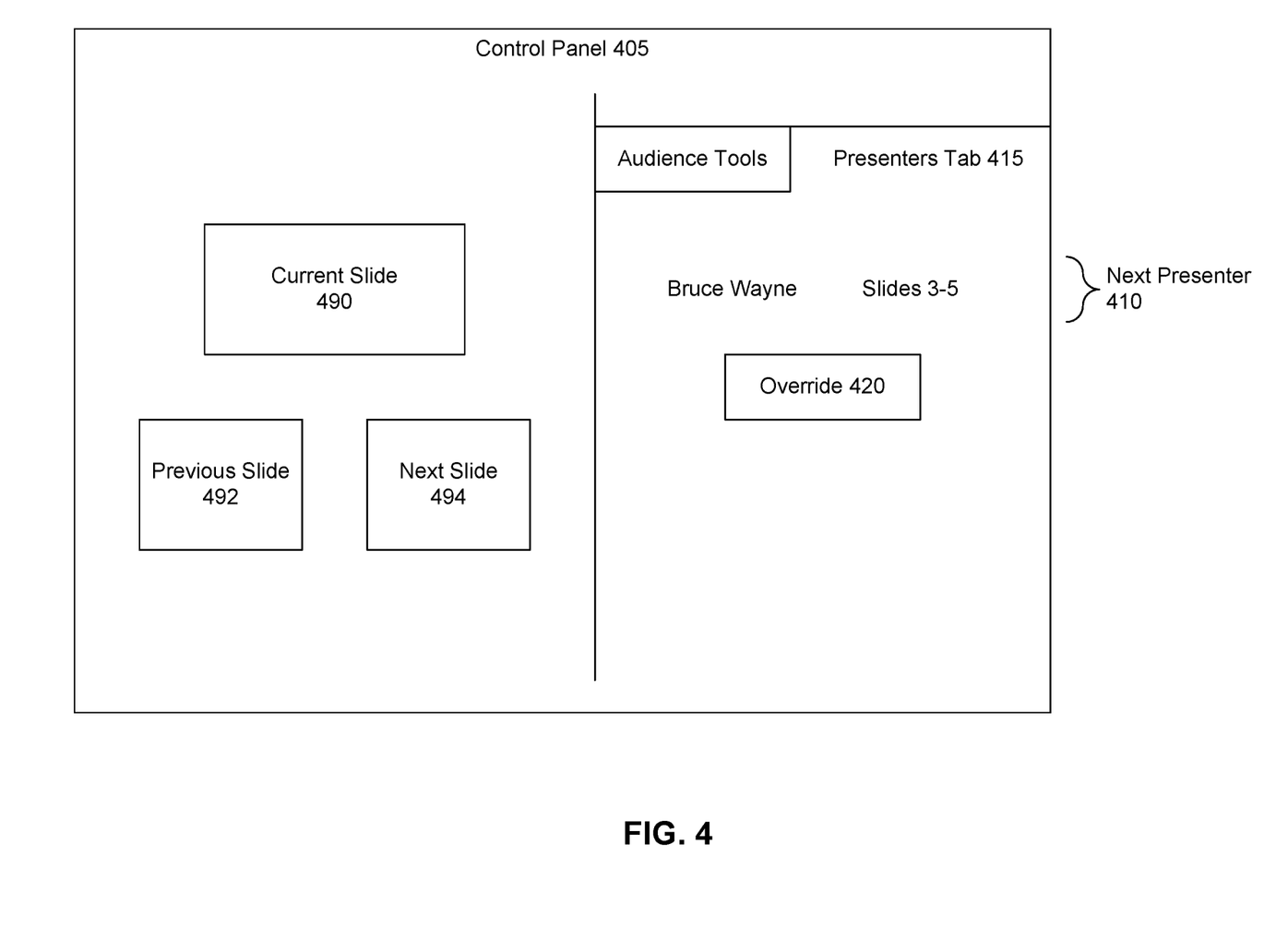
FIG. 4 shows an example of a control panel in accordance with one or more embodiments.

FIG. 4 shows an example of a control panel 405 in accordance with one or more embodiments. Control panel 405 may be displayed to a user with controller status while online presentation 115 is running. As shown in FIG. 4, control panel 405 may display previews of the current slide 490 being displayed, the previous slide 492 that was displayed before the current slide, and the next slide 494 that will be displayed after the current slide.

As also shown in FIG. 4, control panel 405 may have a presenters tab 415 showing the next presenter (i.e. user) 410 who will have controller status for the next slide set, as determine from metadata 120. In other words, presenters tab 415 may display at least a portion of metadata 120. In this example, the next presenter is Bruce Wayne and he has controller status for upcoming slides 3-5.

In one or more embodiments, presenters tab 415 includes an override widget (e.g., button) 420. The user with controller status may select the override widget 420 to prevent controller status from transferring to Bruce Wayne for slides 3-5. Instead, controller status will be remain with the current user for slides 3-5. This feature may be useful when Bruce Wayne is unable to attend the online presentation due to illness, a double-booked schedule, a failed network connection with Bruce Wayne's computing device, etc. This is also discussed above in reference to FIG. 2A.

Figure 5:
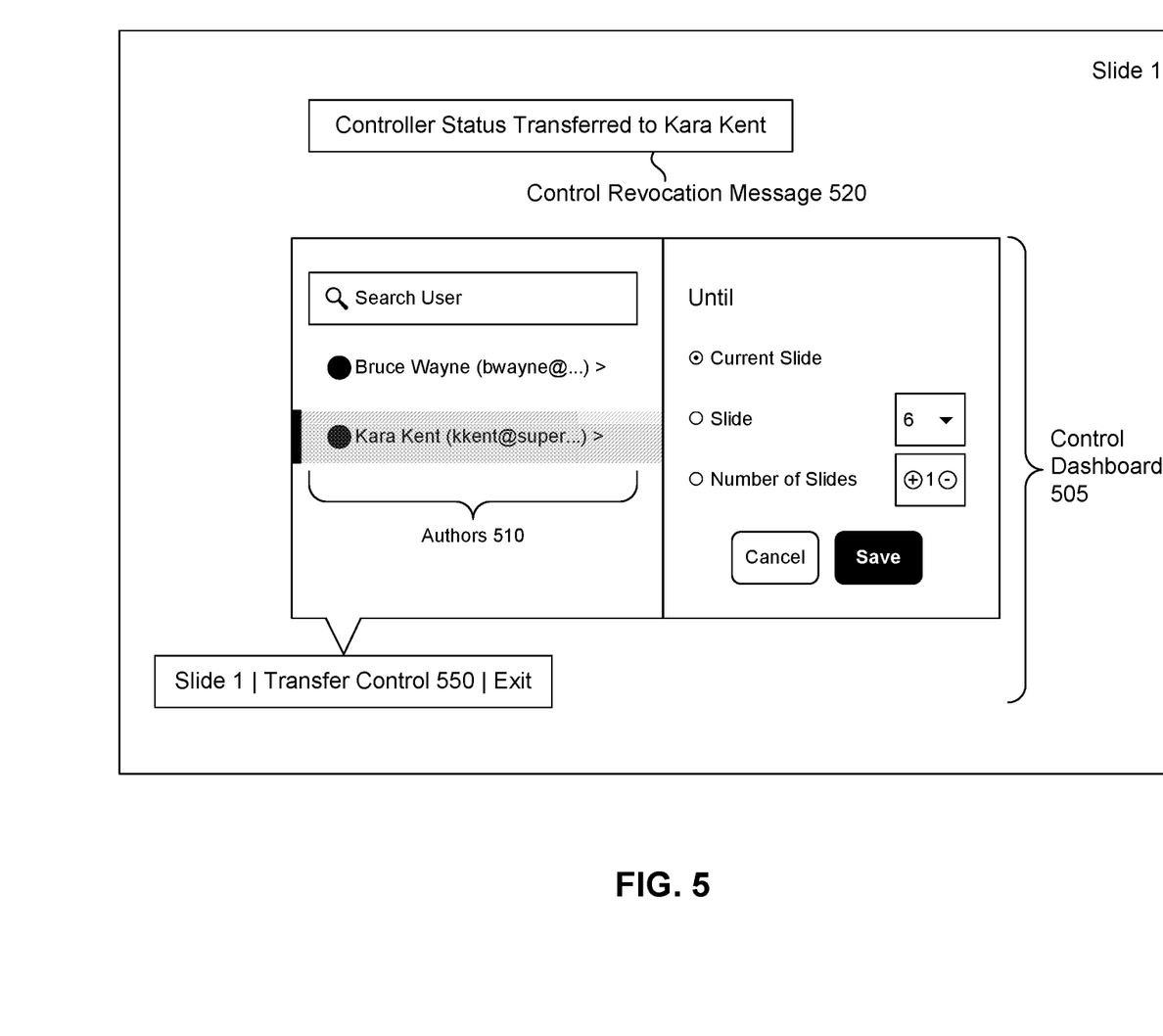
FIG. 5 shows an example of a control dashboard in accordance with one or more embodiments.

FIG. 5 shows an example control dashboard 505 in accordance with one or more embodiments. Control dashboard 505 may be displayed to the user with controller status during online presentation 115 (e.g., while slide 1 is displayed, as shown in FIG. 5). Control dashboard 505 may be displayed in response to the user selecting transfer control button 550.

As discussed above in reference to FIG. 2B, control dashboard 505 enables a user to transfer controller status to another user (e.g., another author). In one or more embodiments, control dashboard 505 is automatically populated with a list of authors 510 of online presentation 115. The list might only include authors who are currently connected to online service 105 and/or who are currently viewing online presentation 115.

As also shown in FIG. 5, the control dashboard has GUI widgets (e.g., radio buttons, dropdown box, etc.). The user with controller status may select one of the authors 510 and then manipulate these GUI widgets to specify one or more slides for which the selected authors(s) will have controller status. These steps are taking place while online presentation 115 is running. The selected author and specified slides may be included in a control transfer request sent to presentation manager 110. When controller status is transferred away from the current user, control revocation message 520 may be displayed to the user.

Figure 6:
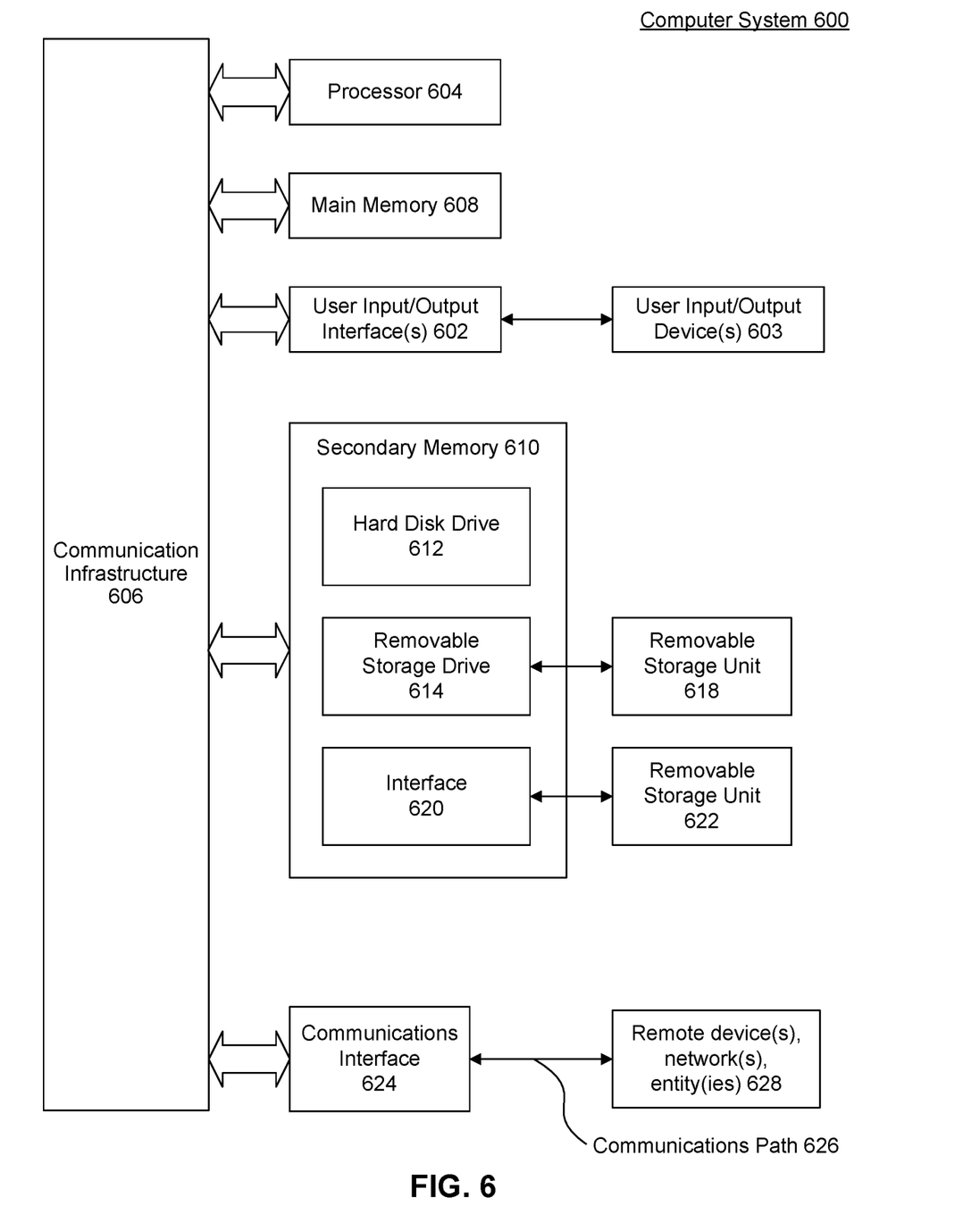
FIG. 6 shows an example computer system useful for implementing various embodiments.

Various embodiments can be implemented, for example, using one or more computer systems, such as computer system 600 shown in FIG. 6. Computer system 600 can be used, for example, to implement the processes shown in FIG. 2A and FIG. 2B. Computer system 600 can also be used to implement the GUIs shown in FIGS. 3-5. For example, computer system 600 can automatically generate a new tile for a dashboard upon detecting a node of the model being populated with data values from an online marketing tool. Computer system 600 can be any computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for controlling access to an online presentation, comprising:
    storing, during generation of the online presentation, metadata specifying that a first user has a controller status for a first slide set and that a second user has the controller status for a second slide set;
    granting, by one or more computing devices and based on the metadata, the controller status to the first user for the first slide set during the online presentation;
    displaying a control panel to the first user in response to the granting, the control panel comprising a list of presenters and corresponding slide sets for which the presenters have controller status as defined by the metadata;
    operating, by the one or more computing devices, the online presentation based on a set of slide commands from the first user having the controller status; and
    transferring, by the one or more computing devices and based on the metadata, the controller status from the first user to the second user for the second slide set in response to receiving a next slide set command from the first user during the online presentation, and wherein the transferring causes the control panel to be displayed to the second user.

2. The method of claim 1, wherein granting the controller status to the first user comprises causing a control grant message to be displayed to the first user, and wherein transferring the controller status comprises causing a control revocation message to be displayed to the first user.

3. The method of claim 2, further comprising:
    storing, during the generation of the online presentation, additional metadata specifying that a third user has the controller status for a third slide set,
    wherein the list of presenters and corresponding slide sets displayed by the control panel comprises an indication that the third user has the controller status for the third slide set; and
        an override widget to prevent transfer of the controller status to the third user for the third slide set;
    receiving an override command from the second user during the presentation of the second slide set, wherein the second user issues the override command by manipulating the override widget in the control panel; and
    granting the second user the controller status for the third slide set based on the override command received from the second user.

4. The method of claim 1, further comprising:
    receiving a control transfer request from the second user while a slide from the second slide set is displayed, the control transfer request specifying that a third user is to have the controller status for a plurality of slides in the second slide set; and transferring, based on the control transfer request, the controller status from the second user to the third user for controlling the plurality of slides in the second slide set during the online presentation.

5. The method of claim 4, further comprising:

populating a control dashboard with authors of the online presentation, the authors comprising the first user, the second user, and the third user, wherein second user generates the control transfer request by manipulating the control dashboard.

6. The method of claim 1, wherein the next slide set command comprises a next slide command.

7. A system for controlling access to an online presentation, comprising:

a memory; and at least one processor coupled to the memory and configured to:

store, during generation of the online presentation, metadata specifying that a first user has a controller status for a first slide set and that a second user has the controller status for a second slide set;

grant, based on the metadata, the controller status to the first user for the first slide set during the online presentation;

display a control panel to the first user in response to the granting, the control panel comprising a list of presenters and corresponding slide sets for which the presenters have controller status as defined by the metadata;

operate the online presentation based on a set of slide commands from the first user having the controller status; and transfer, based on the metadata, the controller status from the first user to the second user for the second slide set in response to receiving a next slide set command from the first user during the online presentation, and wherein the transferring causes the control panel to be displayed to the second user.

8. The system of claim 7, wherein granting the controller status to the first user comprises causing a control grant message to be displayed to the first user, and wherein transferring the controller status comprises causing a control revocation message to be displayed to the first user.

9. The system of claim 8, wherein the at least one processor is further configured to:

store, during the generation of the online presentation, additional metadata specifying that a third user has the controller status for a third slide set, wherein the list of presenters and corresponding slide sets displayed by the control panel comprises an indication that the third user has the controller status for the third slide set; and an override widget to prevent transfer of the controller status to the third user for the third slide set;

receive an override command from the second user during the presentation of the second slide set, wherein the second user issues the override command by manipulating the override widget in the control panel; and grant the second user the controller status for the third slide set based on the override command received from the second user.

10. The system of claim 7, wherein the at least one processor is further configured to:

receive a control transfer request from the second user while a slide from the second slide set is displayed, the control transfer request specifying that a third user is to have the controller status for a plurality of slides in the second slide set; and transfer, based on the control transfer request, the controller status from the second user to the third user for controlling the plurality of slides in the second slide set during the online presentation.

11. The system of claim 10, wherein the at least one processor is further configured to:

populate a control dashboard with authors of the online presentation, the authors comprising the first user, the second user, and the third user, wherein the second user generates the control transfer request by manipulating the control dashboard.

12. A non-transitory computer readable medium (CRM) having instructions stored thereon for controlling access to an online presentation, the instructions, when executed by at least one computing device, cause the at least one computing device to perform operations comprising:

storing, during generation of the online presentation, metadata specifying that a first user has a controller status for a first slide set and that a second user has the controller status for a second slide set;

granting, based on the metadata, a controller status to the first user for the first slide set during the online presentation;

displaying a control panel to the first user in response to the granting, the control panel comprising a list of presenters and corresponding slide sets for which the presenters have controller status as defined by the metadata;

operating the online presentation based on a set of slide commands from the first user having the controller status; and transferring, based on the metadata, the controller status from the first user to the second user for the second slide set in response to receiving a next slide command from the first user during the online presentation, and wherein the transferring causes the control panel to be displayed to the second user.

13. The non-transitory CRM of claim 12, the operations further comprising:

storing, during the generation of the online presentation, additional metadata specifying that a third user is to have the controller status for a third slide set, wherein the list of presenters and corresponding slide sets displayed by the control panel comprises an indication that the third user has the controller status for the third slide set; and an override widget to prevent transfer of the controller status to the third user for the third slide set;

receiving an override command from the second user during the presentation of the second slide set, wherein the second user issues the override command by manipulating the override widget in the control panel; and granting the second user the controller status for the third slide set based on the override command received from the second user.

14. The non-transitory CRM of claim 12, the operations further comprising:

receiving a control transfer request from the second user while a slide from the second slide set is displayed, the control transfer request specifying that a third user is to have the controller status for a plurality of slides in the second slide set; and transferring the controller status from the second user to the third user for control of the plurality of slides in the second slide set during the online presentation based on the control transfer request.

15. The non-transitory CRM of claim 14, the operations further comprising:

populating a control dashboard with authors of the online presentation, the authors comprising the first user, the second user, and the third user, wherein the second user generates the control transfer request by manipulating the control dashboard.

* * * * *